Figure 1:
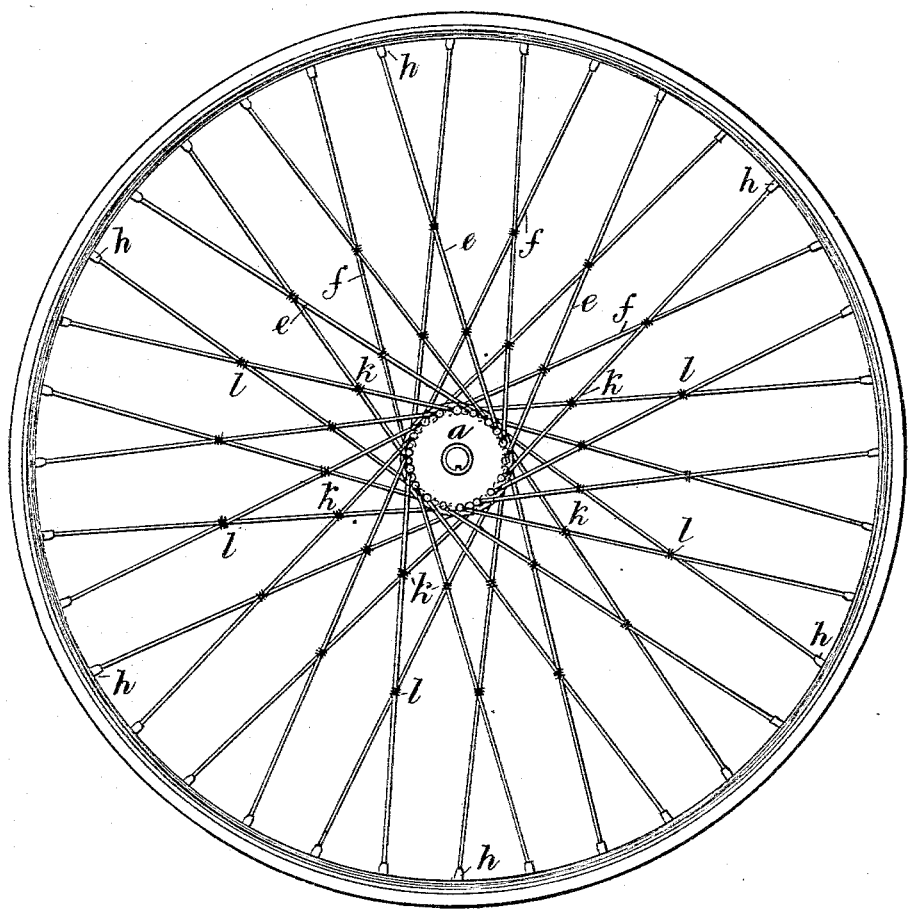

(No Model.)

C. A. E. T. PALMER.
WHEEL FOR BICYCLES.

No. 359,809. Patented Mar. 22, 1887.

Witnesses:—
George Shaw
Richard Skerrett

Inventor:—
Charles Andrew Edward Talbot Palmer.

(No Model.)  
C. A. E. T. PALMER.  
WHEEL FOR BICYCLES.  
3 Sheets—Sheet 2.
No. 359,809. Patented Mar. 22, 1887.
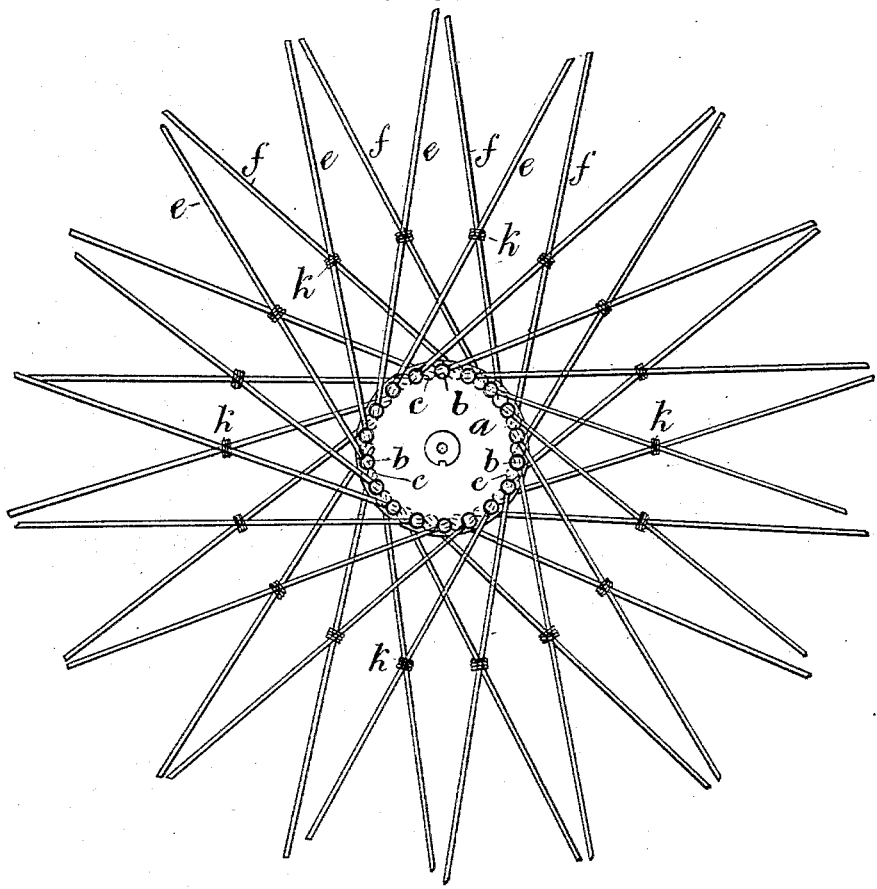
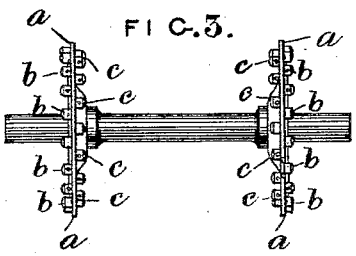
Witnesses:—
George Shaw
Richard Skerrett
Inventor:—
Charles Andrew Edward Talbot Palmer.

(No Model.)  
C. A. E. T. PALMER.  
WHEEL FOR BICYCLES.  
No. 359,809.  
3 Sheets—Sheet 3.
Patented Mar. 22, 1887.
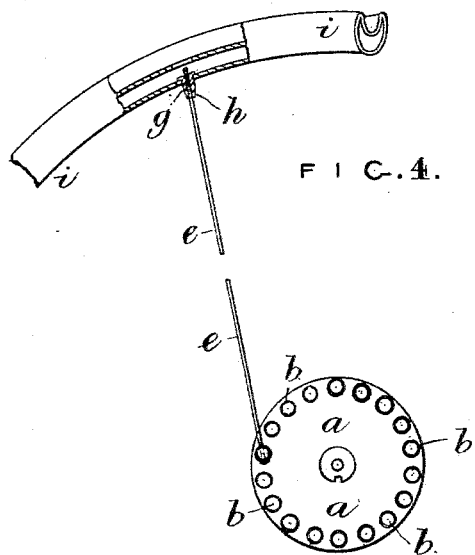
FIG. 4.
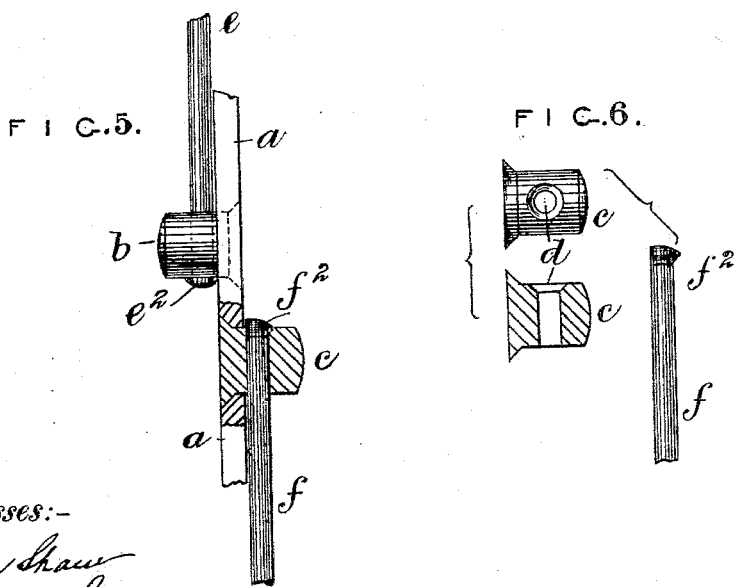
FIG. 5.
FIG. 6.
Witnesses:—
George Shaw
Richard Skerrett
Inventor:—
Charles Andrew Edward Talbot Palmer

United States Patent Office.

CHARLES ANDREW EDWARD TALBOT PALMER, OF HANDSWORTH, COUNTY OF STAFFORD, ASSIGNOR TO JOHN CORNFORTH, OF EDGBASTON, BIRMINGHAM, ENGLAND.

WHEEL FOR BICYCLES.

SPECIFICATION forming part of Letters Patent No. 359,809, dated March 22, 1887.

Application filed December 28, 1886. Serial No. 222,831. (No model.) Patented in England December 16, 1885, No. 15,451.

*To all whom it may concern:*

Be it known that I, CHARLES ANDREW EDWARD TALBOT PALMER, of Handsworth, in the county of Stafford, England, a subject of the Queen of Great Britain, have invented Improvements in Wheels for Bicycles, Tricycles, and other Velocipedes, and for other Purposes, (for which I have obtained a patent in Great Britain, No. 15,451, bearing date December 16, 1885,) of which the following is a specification.

My invention consists of the improvements, hereinafter described, in the construction of wheels principally for bicycles, tricycles, and other velocipedes, but applicable also to various other purposes.

The object of my invention is the production of wheels in which great strength is combined with great lightness and simplicity of construction.

I will describe my invention as applied to a bicycle-wheel.

As the hub of a bicycle-wheel has two flanges, and as my method of connecting the spokes of the wheel to each of the flanges is the same, I will describe my improvements as applied to one flange of the hub, it being understood that the description applies to both flanges. In the flange of the hub, and near its periphery, I make a series of equidistant holes, the said holes passing through the flange and equaling in number the number of spokes to be connected to the flange. In each of these holes I insert a headed pin or nipple, the said headed pins being so inserted in the said holes that the heads of alternate pins are on the exterior face of the flange, while the heads of the intermediate pins are on the inner face of the flange. In that part of each pin which protrudes through the flange a cross-hole is made, and the inner ends of the spokes occupy the said holes. The spokes consist of wires headed at their inner ends. The said spokes are inserted in their places by the unheaded ends being passed through the holes in the pins until their heads abut against the said pins, the holes being countersunk to receive the conical under side of the heads. The spokes are so inserted in the said holes that adjacent spokes turn in opposite directions; hence all the spokes on one side of the flange turn in one direction and all the spokes on the other side of the flange turn in the opposite direction. The outer ends of the spokes are connected with the rim of the wheel in any of the ordinary ways. From the description given it will be understood that the spokes are all tangential to a circle passing through the centers of the holes in the flange, and that each spoke is nearly in a line with the adjacent one, but is turned in the opposite direction—that is, each spoke makes a very obtuse angle with the adjacent one. Where the spokes cross each other they are connected by wire and soldering or otherwise.

Figure 1 of the accompanying drawings represents in front elevation a bicycle-wheel constructed according to my invention. Fig. 2 represents a portion of the same drawn to a larger scale. Fig. 3 represents a side elevation of the axle and hub of the wheel without the spokes; and Fig. 4 represents a front elevation of one of the flanges of the hub, together with a portion of the rim of the wheel and a spoke drawn to the same scale as Figs. 2 and 3. Fig. 5 represents, partly in elevation and partly in section, a portion of one of the flanges of the hub with two of the spokes connected to it drawn double the full size; and Fig. 6 represents in elevation and section one of the headed pins or nipples and the inner or headed end of a metallic spoke drawn to the same scale as Fig. 5.

The same letters of reference indicate the same parts in the several figures of the drawings.

*a a* are the two flanges of the hub, the metallic spokes being connected to each of the said flanges in the same manner.

*b c* are the headed pins or nipples inserted in holes near the periphery of the flange *a*. To these pins or nipples the inner ends of the metallic spokes are connected, the set of the headed pins marked *b* being situated on one face of the flange *a*, and the set of headed pins marked *c* being situated on the opposite face of the said flange, a pin on one face being situated between two pins on the opposite face. (See Figs. 3 and 5.)

In that part of the pins or nipples $b\ c$ which protrudes through the hole in the flange $a$ is a cross-hole, $d$, (see Fig. 6,) and the headed inner ends of the spokes occupy the said holes, which are countersunk to receive the conical under side of the heads. The spokes are tangential or nearly tangential to a circle drawn through the centers of the headed pins $b\ c$, and are arranged as hereinafter described. The set of tangential spokes which are inserted in the pins or nipples $b\ b$ on the outer face of the flange $a$ is marked $e\ e$, and the set of tangential spokes which are inserted in the pins or nipples $c\ c$ on the inner face of the flange $a$ is marked $f\ f$; the inner headed ends of the spokes $e$ being marked $e^2$, and the inner headed ends of the spokes $f$ being marked $f^2$. The outer ends of the several spokes $e\ f$ are screwed at $g$ (see Fig. 4) for connecting them to the metallic rim $i$ of the wheel.

The spokes are connected to the hub and rim in the following manner: The spokes are passed by their outer or unheaded ends through the holes $d$ in the pins or nipples $b\ c$ until their heads $e^2\ f^2$ abut against the said pins or nipples, the conical under sides of the said heads seating themselves in the countersunk parts of the said holes $d$, as represented in Fig. 5. The outer screwed ends, $g$, of the spokes are next connected to the rim $i$ by means of the tubular screw-nuts or screw-boxes $h\ h$. The said screw-nuts or screw-boxes $h$ are enlarged or flanged at top, and are passed through holes in the rim $i$ from the outer side, the enlargements or flanges of the said screw-nuts or screw-boxes bearing on the said rim, as seen in Fig. 4. By turning the tubular screw-nuts or screw-boxes $h$ by their projecting outer ends, which are made angular, for convenience in turning them, the metallic spokes are secured to the rim $i$ and the required tension put upon them. Other methods than that represented may be used for connecting the outer ends of the spokes to the rim of the wheel. In this way the several spokes are fastened in their places, the crossing of the pins or nipples $b\ c$ by the spokes holding them in their places in the holes of the flange $a$.

It will be seen by an examination of the drawings that the spokes are so inserted in the holes $d$ in the pins or nipples $b\ c$ that the set of spokes $e$ on the outer side of the flange $a$ are turned in one direction and the set of spokes $f$ on the inner side of the flange $a$ are turned in the opposite direction, so that adjacent spokes are inclined in opposite directions. It will also be seen that the spokes are all tangential or nearly tangential to a circle passing through the centers of the holes in the flange $a$, in which the pins or nipples $b\ c$ are inserted. The crossing parts of the spokes $k\ l$ may be connected by wire bound round the crossing parts and soldered. By arranging and connecting the spokes in the manner described a direct tensile strain is put on each spoke without any oblique strain.

In consequence of the nipples being capable of an angular motion in the holes in the flange, any broken or damaged spoke may be readily removed and replaced by a new one.

Besides being applicable to wheels for bicycles, tricycles, and other velocipedes, my improvements are also applicable to wheels for ordinary carriages, as well as to wheels for various other purposes.

Having now particularly described and ascertained the nature of my invention and the manner in which the same is to be performed, I declare that I claim as my invention of improvements in wheels for bicycles, tricycles, and other velocipedes and for other purposes—

Connecting two sets of metallic spokes to each of the flanges of the hub of the wheel by means of heads on the inner ends of the spokes seating themselves in countersunk cross-holes in headed pins or nipples inserted in holes in the flange, one set of spokes being connected to pins or nipples on one face of the flange and the other set of spokes to pins or nipples on the other face of the flange, a pin or nipple on one face being situated between two pins or nipples on the opposite face, one set of the spokes being turned or inclined in one direction and the other set of spokes in the opposite direction, and all the spokes being tangential or nearly tangential to a circle passing through the several holes in the flange in which the headed pins or nipples are inserted, substantially as hereinbefore described, and illustrated in the accompanying drawings.

CHARLES ANDREW EDWARD
        TALBOT PALMER. [L. S.]

Witnesses:
  GEORGE SHAW,
  RICHARD SKERRETT.